United States Patent
Aitharaju et al.

(10) Patent No.: US 11,273,611 B2
(45) Date of Patent: Mar. 15, 2022

(54) REINFORCED PREFORM AND METHOD FOR MOLDING

(71) Applicant: GM GLOBAL TECHNOLOGY OPERATIONS LLC, Detroit, MI (US)

(72) Inventors: Venkateshwar R. Aitharaju, Troy, MI (US); William R. Rodgers, Bloomfield Township, MI (US); Selina X. Zhao, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 16/594,288

(22) Filed: Oct. 7, 2019

(65) Prior Publication Data

US 2021/0101350 A1    Apr. 8, 2021

(51) Int. Cl.
| | | |
|---|---|---|
| *B29C 70/00* | (2006.01) | |
| *B33Y 80/00* | (2015.01) | |
| *B29B 11/00* | (2006.01) | |
| *B29B 13/00* | (2006.01) | |
| *B29C 70/46* | (2006.01) | |
| *B29C 70/54* | (2006.01) | |
| *B29B 13/02* | (2006.01) | |
| *B29B 11/16* | (2006.01) | |
| *B29B 11/14* | (2006.01) | |
| *B29L 31/30* | (2006.01) | |

(52) U.S. Cl.
CPC .......... *B29C 70/467* (2013.01); *B29B 11/00* (2013.01); *B29B 11/14* (2013.01); *B29B 11/16* (2013.01); *B29B 13/023* (2013.01); *B29C 70/541* (2013.01); *B33Y 80/00* (2014.12); *B29L 2031/3076* (2013.01); *Y10T 428/24* (2015.01); *Y10T 428/24777* (2015.01)

(58) Field of Classification Search
CPC ......... B29C 70/00; B29C 70/40; B29C 70/46; B29C 70/467; B29C 70/50; B29C 70/54; B29C 70/541; B33Y 80/00; B29B 11/00; B29B 11/10; B29B 11/14; B29B 11/16; B29B 13/00; B29B 13/02; B29B 13/023
See application file for complete search history.

(56) References Cited

FOREIGN PATENT DOCUMENTS

| | | |
|---|---|---|
| DE | 102013003530 A1 | 3/2014 |
| DE | 102012024060 A1 | 6/2014 |
| DE | 20131018148 A1 | 6/2015 |
| DE | 202016100796 U1 | 5/2017 |
| DE | 102016001238 A1 | 8/2017 |
| EP | 3473397 A1 | 4/2019 |

*Primary Examiner* — Jacob T Minskey
*Assistant Examiner* — Matthew Hoover
(74) *Attorney, Agent, or Firm* — Quinn IP Law (57) ABSTRACT

A reinforced preform includes a sheet of reinforced material having opposed first and second edges, with each edge having a respective first connection point located therealong. The preform also includes first and second tethers, with each tether being attached at a respective first end thereof to a respective one of the first connection points and having a respective second end thereof terminating in at least one of: a respective loop tied at the respective second end, a respective knot tied at the respective second end, a respective graspable member to which the respective second end is connected, and an attachment to a respective second connection point located along a perimeter of the sheet. A method and mold for molding a reinforced preform are also disclosed.

20 Claims, 10 Drawing Sheets

REINFORCED PREFORM AND METHOD FOR MOLDING

GOVERNMENT FUNDING

This invention was made with Government support under Agreement. No. DE-EE0006826 awarded by the Department of Energy. The Government may have certain rights in the invention.

INTRODUCTION

This disclosure relates generally to reinforced preforms made of reinforced material, and methods and molds for molding such preforms.

One method for fabricating a structural or cosmetic part is to place one or more layers of reinforced preforms into a two-part mold consisting of male and female mold halves, and then pressing the mold halves together to form the part. After the one or more layers are pressed and formed by the mold, the process may be repeated with additional layers being added to the already-formed layers until the desired thickness is achieved and the finished part is produced.

Variability in the placement or alignment of reinforced preforms within molds sometimes results in uncertainty as to the resulting properties of the molded parts. Additionally, wrinkles, kinks, bunchings and other undesired features may inadvertently be introduced into the part because of inconsistencies or errors in the placement or alignment of the preforms.

SUMMARY

According to one embodiment, a reinforced preform includes a sheet of reinforced material having opposed first and second edges, with each edge having a respective first connection point located therealong. The preform also includes first and second tethers, with each tether being attached at a respective first end thereof to a respective one of the first connection points and having a respective second end thereof terminating in at least one of:
a respective loop tied at the respective second end, a respective knot tied at the respective second end, a respective graspable member to which the respective second end is connected, and an attachment to a respective second connection point located along a perimeter of the sheet. The preform may further include at least two alignment apertures formed in the sheet of reinforced material and spaced apart from each other.

The graspable member may be one of a ring, a bar and a T-shaped member, and the tethers may be made of reinforced material. Each first connection point may be located at a respective corner of a respective one of the first and second edges. The respective first and second connection points for each of the first and second tethers may be on a respective one of the first and second edges. The tethers and the sheet of reinforced material may be formed together during a singular fabrication process. The tethers and the sheet of reinforced material may be cut from a single blank of reinforced material, or the tethers and the sheet of reinforced material may be created as a unitary structure by additive manufacturing. Alternatively, the tethers may be formed separately from the sheet of reinforced material and may be attached to the sheet of reinforced material after fabrication of the sheet of reinforced material.

According to one embodiment, a mold for molding a reinforced preform includes a first mold half having a first molding surface and a second mold half having a second molding surface, with the first and second mold halves being disposed with the first and second molding surfaces facing each other. The mold halves may be configured to transition between an open position in which the mold halves are spaced apart from each other and a generally closed position in which the mold halves are proximate each other and define a mold body having a cavity between the first and second molding surfaces. The mold may further include first and second moving members, each having a respective coupling configured for connection with a respective portion of the reinforced preform and a respective actuator configured for moving the respective coupling between a respective first position in which the respective coupling is disposed at a respective first distance from a center of the mold body and a respective second position in which the respective coupling is disposed at a respective second distance from the center of the mold body that is greater than the first distance, wherein the first position of each respective coupling is located in the first mold half, in the second mold half or outside the mold body.

The first molding surface may generally protrude outward from the first mold half, and the second molding surface may generally recede into the second mold half. The reinforced preform may be configured for placement over the first molding surface and the couplings may be configured for connection with the respective portions of the reinforced preform.

The mold may further include a first emitter disposed in the first mold half and configured to emit light therefrom into the cavity, a first receiver disposed in the second mold half and configured to receive light from the first emitter and produce a first signal indicative of the light received from the first emitter, a second emitter disposed in one of the first and second mold halves and configured to emit light therefrom into the cavity, and a second receiver disposed in the other of the first and second mold halves and configured to receive light from the second emitter and produce a second signal indicative of the light received from the second emitter. The mold may further include a controller operatively connected to the first and second emitters, the first and second receivers, and the first and second moving members, the controller being configured to: (i) cause each respective actuator to move its respective coupling from its respective first position to its respective second position, (ii) cause the first and second emitters to emit light, (iii) receive the first and second signals from the first and second receivers, (iv) determine an alignment condition based on the first and second signals, (v) determine if the alignment condition meets predetermined criteria, (vi) if the alignment condition meets the predetermined criteria, then transition the mold halves from the open position to the generally closed position, and (vii) send an error condition alert, and/or cause at least one of the actuators to move its respective coupling from its respective first position to a respective adjusted position different from the second position based on the alignment condition.

According to one embodiment, a method for molding a reinforced preform in a mold, wherein the preform includes a sheet of reinforced material and has opposed first and second side portions, and wherein the mold has first and second mold halves presenting respective first and second molding surfaces, the first and second mold halves defining a mold body and being disposed with the first and second molding surfaces facing each other, includes: positioning the preform between the first and second mold halves, and moving at least one of the first and second side portions away from a center of the mold body so as to stretch the sheet of reinforced material. The method may further include adjusting a placement of the preform by moving the first and second side portions in a first direction, and/or adding a resin to the sheet of reinforced material. The method may further include transitioning the first and second mold halves from an open position in which the mold halves are spaced apart from each other to a generally closed position in which the mold halves are proximate each other, thereby forming a molded preform. The method may further include transitioning the first and second mold halves from the generally closed position to the open position, and placing another reinforced preform between the first and second mold halves in registration with the molded preform.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a reinforced preform 20, a mold 70 for molding a reinforced preform 20, and methods 200, 300 for molding a reinforced preform 20 in a mold 70 are shown and described herein.

FIGS. 1-6 show schematic top views of various embodiments of a reinforced preform 20 according to the present disclosure. Each preform 20 includes a sheet 22 of reinforced material having opposed first and second edges 24, 26. Although the sheet 22 is illustrated in the drawings as being generally rectangular in shape, the sheet 22 may assume any suitable shape and is not limited to generally rectangular. The reinforced material may be fiberglass, polyester, polyamide, carbon fiber, cloth/fabric and/or other similar materials, which may be rendered in the form of strands, filaments, weaves, strips, sheets, chopped segments, etc., in one or more plies or layers, and with or without a resin/binder. Each of the opposed first and second edges 24, 26 has a respective one or more first connection point(s) 32, 34, 36, 38 located therealong.

Figure 1:
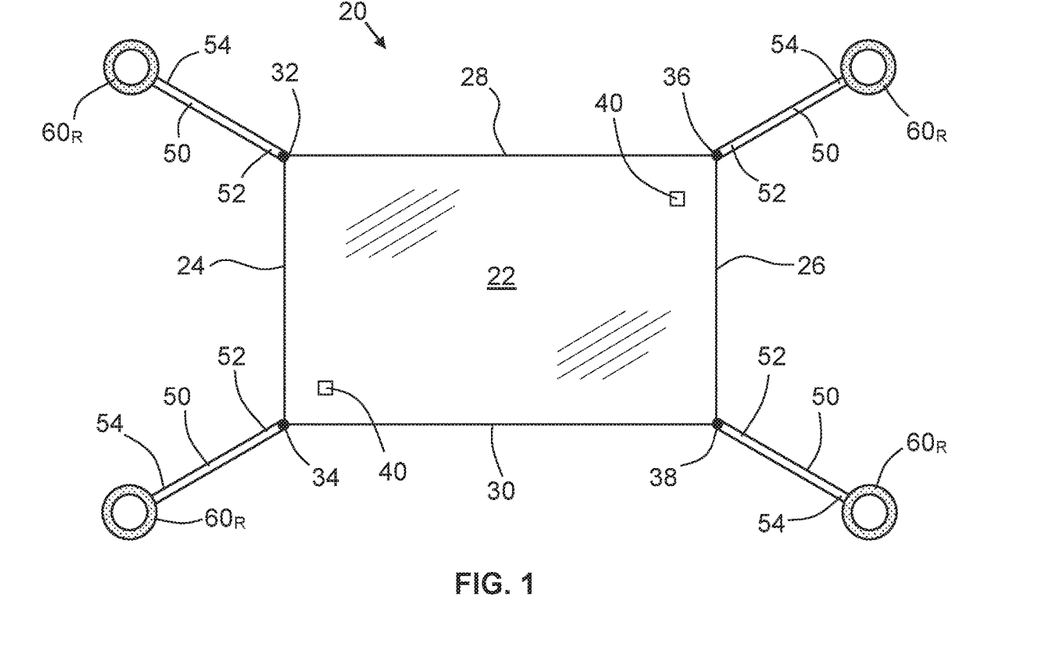
FIGS. 1-6 are schematic top views of various embodiments of a reinforced preform.
Figure 2:
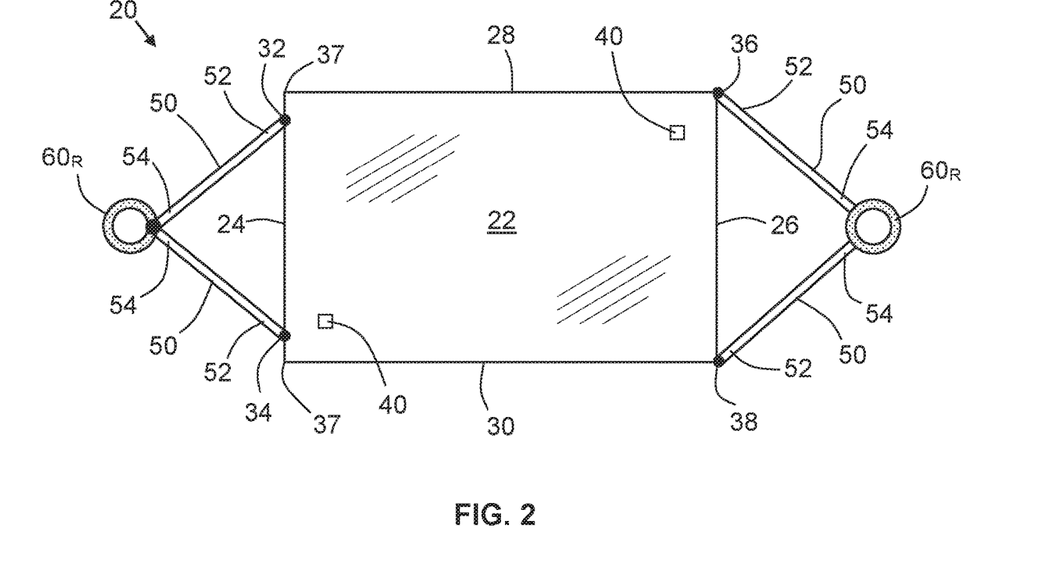
Figure 3:
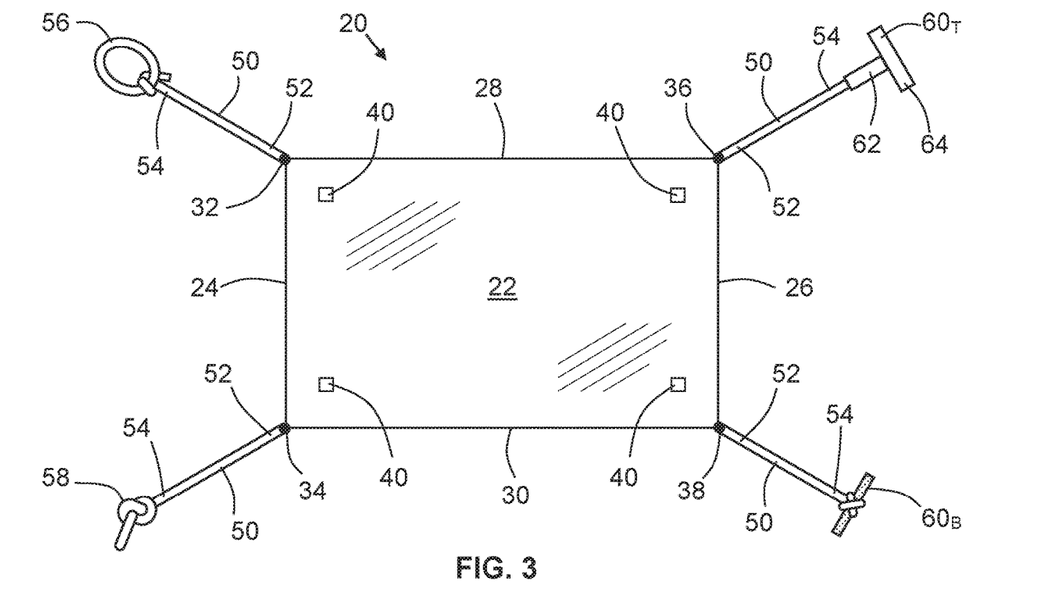
Figure 4:
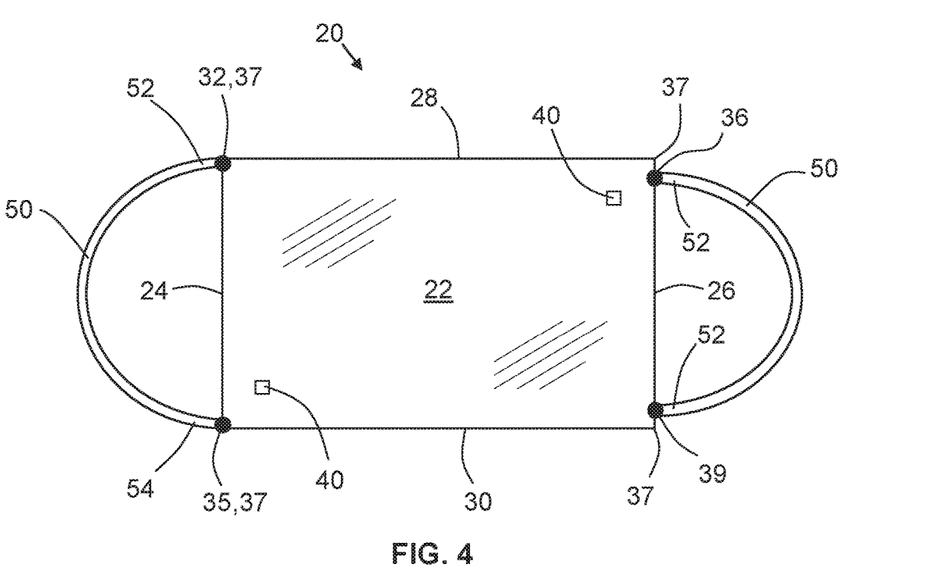
Figure 5:
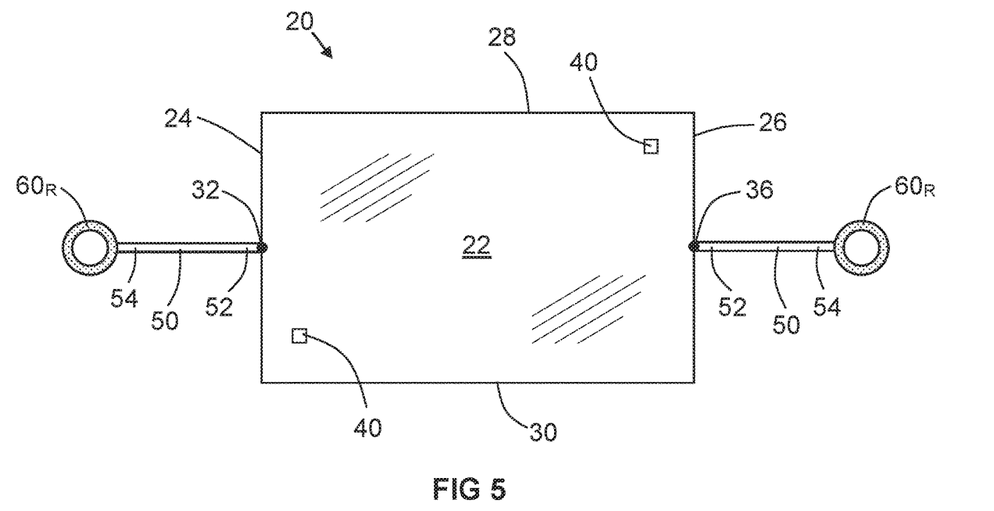
Figure 6:
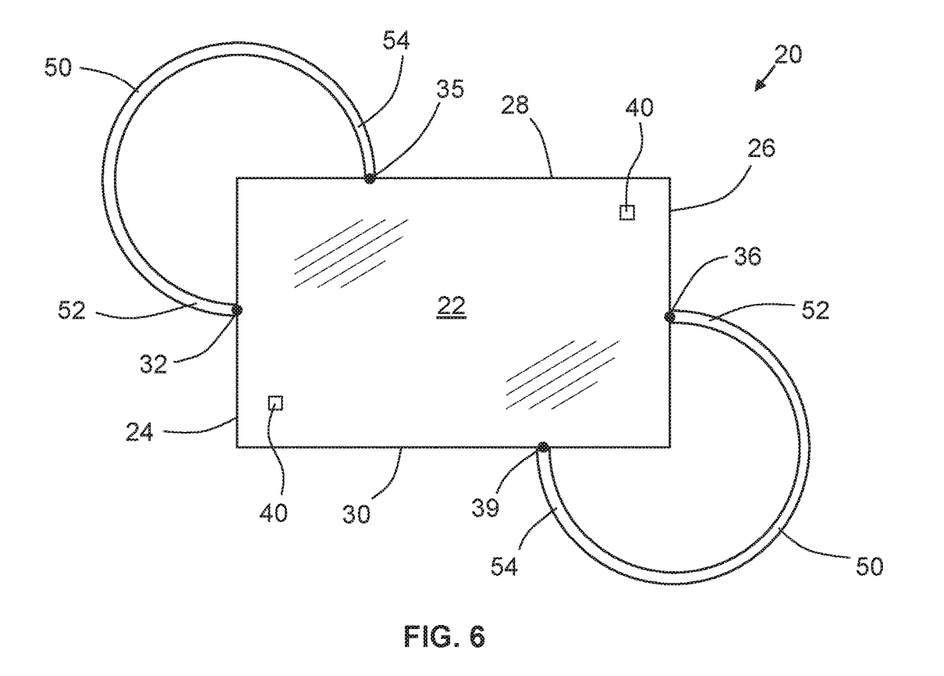

Each preform 20 includes first and second tethers 50. Each tether 50 is attached at a respective first end 52 thereof to a respective one of the first connection points 32, 34, 36, 38, and has a respective second end 54 thereof terminating in at least one of the following: (i) a respective loop 56 tied in at the respective second end 54, (ii) a respective knot 58 tied at the respective second end 54, (iii) a respective graspable member 60 to which the respective second end 54 is connected, and (iv) an attachment to a respective second connection point 35, 39 located along a perimeter of the sheet 22. (For example, the perimeter may include edges 24, 26, 28 and 30.) The graspable member 60 may be a ring $60_R$, a bar $60_B$, a T-shaped member $60_T$, or the like. As used herein, reference numeral 60 denotes any type of graspable member, whereas the subscripted reference numerals $60_R$, $60_B$ and $60_T$ denote specific types or configurations of graspable members. FIGS. 1, 2 and 5 illustrate the use of graspable members $60_R$ shaped as rings, while FIG. 3 illustrates the use of graspable members 60 shaped or configured as a bar $60_B$ or a T-shaped member $60_T$. The T-shaped member $60_T$ may include an axial portion 62 and a lateral portion 64, with the second end 54 of the tether 50 attached to one or both of these portions 62, 64. FIG. 3 also illustrates the use of loops 56 or knots 58 tied or formed at the second ends 54 of tethers 50. Note that each of the rings $60_R$ or other graspable members 60 may be attached to a single tether 50 (as in FIGS. 1 and 5) or to two or more tethers 50 (as in FIG. 2). FIGS. 4 and 6 illustrate the tethers 50 terminating in attachments to respective second connection points 35, 39 located along the perimeter of the sheet 22.

As shown in FIGS. 1, 3, the right-hand side or second edge 26 of FIG. 2, and the left-hand side or first edge 24 of FIG. 4, each first connection point 32, 34, 36, 38 may be located at a respective corner 37 of a respective one of the first and second edges 24, 26. Or, as illustrated in FIG. 5, the left-hand side or first edge 24 of FIG. 2, and the right-hand side or second edge 26 of FIG. 4, each first connection point 32, 34, 36, 38 may be along a respective edge 24, 26 at a point other than the corner 37, such as generally in the middle of the edge 24, 26 (FIG. 5) or slightly away from but near a corner 37 (FIGS. 2 and 4). As shown in FIG. 4, the respective first connection point 32, 36 and second connection point 35, 39 for each of the first and second tethers 50 may both be on a respective one of the first and second edges 24, 26. For example, the tether 50 on the left-hand side of FIG. 4 has its associated first connection point 32 and second connection point 35 along the first/left edge 24, and the tether 50 on the right-hand side has its first connection point 36 and second connection point 39 along the second/right edge 26. However, in FIG. 6, the first connection point 32, 36 and second connection point 35, 39 associated with each tether 50 are not located on the same edge. For example, the upper-left tether 50 in FIG. 6 has its associated first connection point 32 along the first/left edge 24 and its second connection point 35 along the adjacent top edge 28, and the lower-right tether 50 has its first connection point 36 along the second/right edge 26 and its second connection point 39 along the adjacent bottom edge 30.

The tethers 50 may be made of reinforced material, which may be the same as or different from the reinforced material from which the sheet 22 is made. The tethers 50 and the sheet 22 of reinforced material may be formed together during a singular fabrication process, such as being cut from a single blank of reinforced material, or created as a unitary structure by an additive manufacturing process such as 3D printing. Alternatively, the tethers 50 may be formed separately from the sheet 22 of reinforced material, and may be attached to the sheet 22 after fabrication of the sheet 22, such as by using an adhesive, resin, mechanical coupling or the like.

Each sheet 22 of reinforced material may further include two or more alignment apertures 40 formed in the sheet 22 and spaced apart from each other. These apertures 40 may be used to make sure the preform 20 or sheet 22 is properly oriented and aligned within the mold 70, such as by aligning the apertures 40 with emitters 82 and receivers/sensors 84 within the mold 70, as further discussed below.

FIGS. 7-14 show various configurations of a mold 70 for molding a reinforced preform 20 according to the present disclosure. The mold 70 includes a first mold half 72 having a first molding surface 74 and a second mold half 76 having a second molding surface 78. Note that x-y-z coordinate axes are provided in the lower-left corners of FIGS. 7 and 9. (These follow the conventional "right-hand rule" approach for defining the respective positive and negative directions for each axis. Note that the negative y-direction is denoted in FIG. 7 as a circle with an "X" inside, indicating the tail of an arrow pointing out of the page at the viewer, with the head of the arrow pointing into the page away from the viewer in the positive y-direction. Similarly, in FIG. 9 the positive z-direction is denoted by a circle with a point inside, indicating the head of an arrow pointing out of the page at the viewer in the positive z-direction.) These coordinate axes are provided for reference purposes only, but are useful for defining certain arbitrary directions that are referred to herein for the purpose of illustration. For example, the positive z-direction may be associated with directions, locations and orientations such as "upward", "top", "above" and the like, while the negative z-direction may be associated with "downward", "bottom", "below", etc. The directions, locations and orientations relating to the positive and negative z-directions are denoted by reference numerals $87_T$ and $87_B$, respectively (where the subscript "T" denotes "top" and "B" denotes "bottom"). Similarly, $87_F$ and $87_R$ denote the "front/forward" and "rear/rearward" directions, locations and orientations in the negative and positive y-directions, respectively. Likewise, $88_L$ and $88_R$ denote "first/left/leftward" and "second/right/rightward" sides, directions, locations and orientations in the negative and positive x-directions, respectively. Thus, reference numeral $87_T$ may refer to the space above the top of the mold 70, and/or to the top outer surface of the mold 70 itself (i.e., the surface of the second/top mold half 76 that is opposite the second molding surface 78). Likewise, reference numerals $87_B$, $87_F$, $87_R$, $88_L$ and $88_R$ may each refer to the space below, in front of, to the rear of, to the left of and to the right of the mold 70, respectively, and/or to the bottom, front, rear, left and right outer surfaces of the mold 70, respectively.

Figure 7:
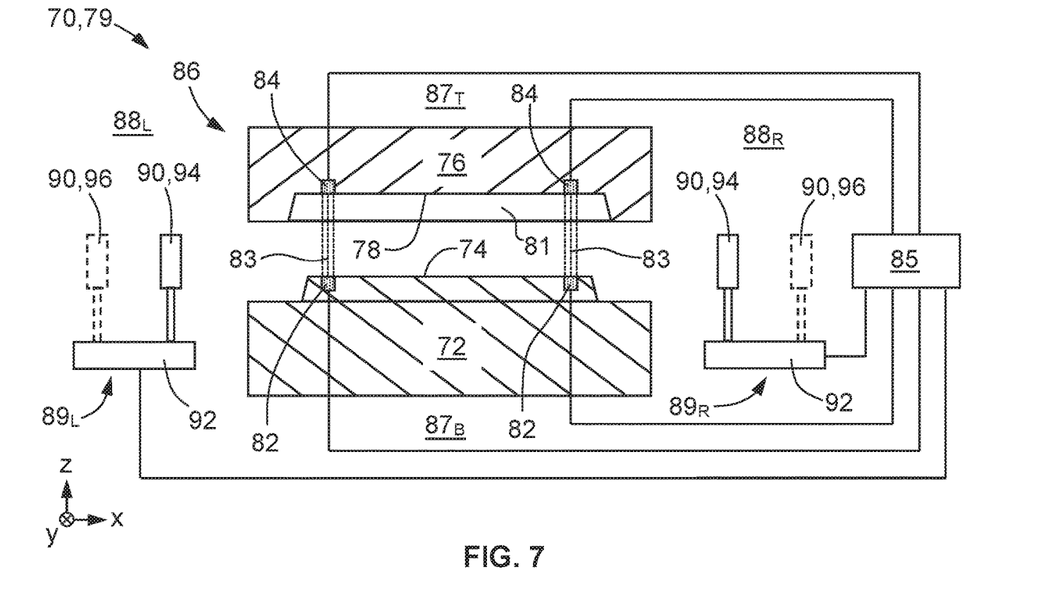
FIGS. 7-8 are schematic semi-sectional front views of a mold in open and generally closed positions, respectively.
Figure 8:
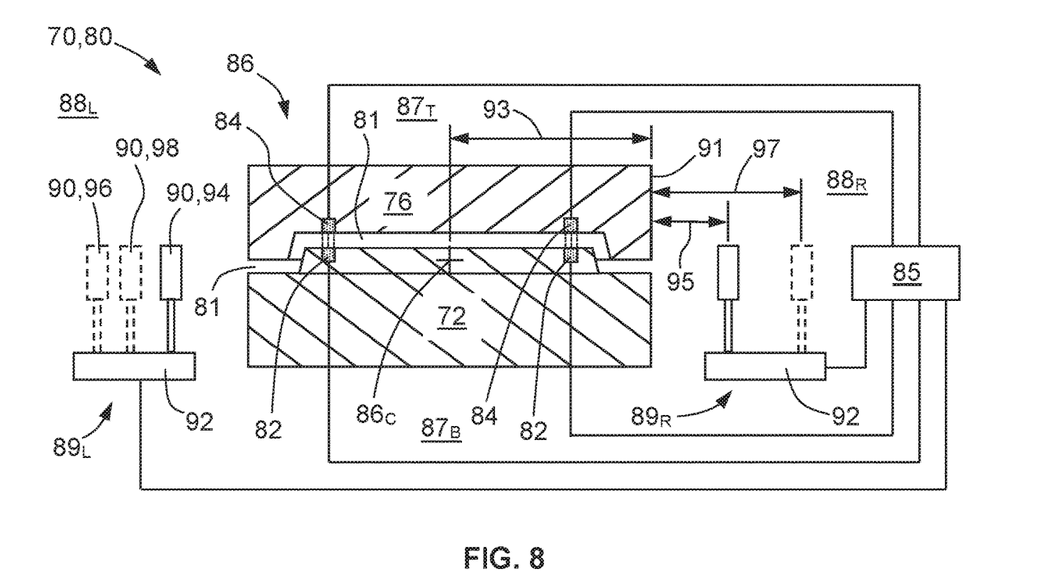

The first and second mold halves 72, 76 are disposed or oriented with the first and second molding surfaces 74, 78 facing each other, with the mold halves 72, 76 being configured to transition between an open position 79 in which the mold halves 72, 76 are spaced apart from each other (FIG. 7), and a generally closed position 80 in which the mold halves 72, 76 are proximate each other and define a mold body 86 having a cavity 81 between the first and second molding surfaces 74, 78 (FIG. 8). This cavity 81 may be provided to capture the one or more layers of reinforced sheets 22 or preforms 20 sandwiched between the opposed molding surface 74, 78 when the mold halves 72, 76 are pressed together in the generally closed position 80. (Note that the mold halves 72, 76 may be configured such that the distance separating the two molding surfaces 74, 78 may be increased as successive layers of reinforced sheets 22 or preforms 20 are added to the already-molded layers that are in the mold 70.)

Figure 9:
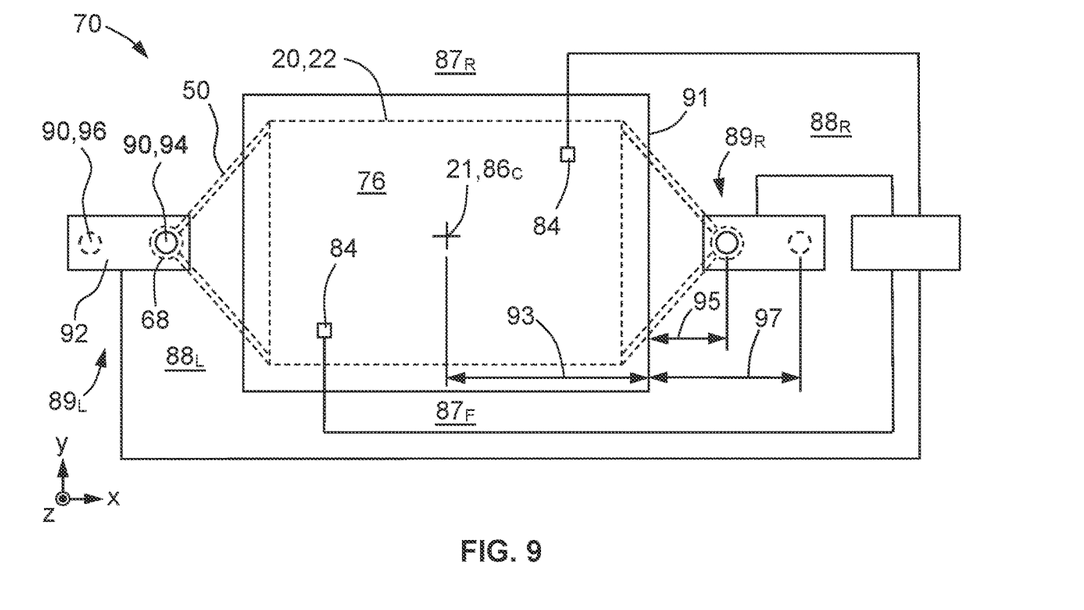
FIG. 9 is a schematic top view of one embodiment of a mold and a reinforced preform.
Figure 10:
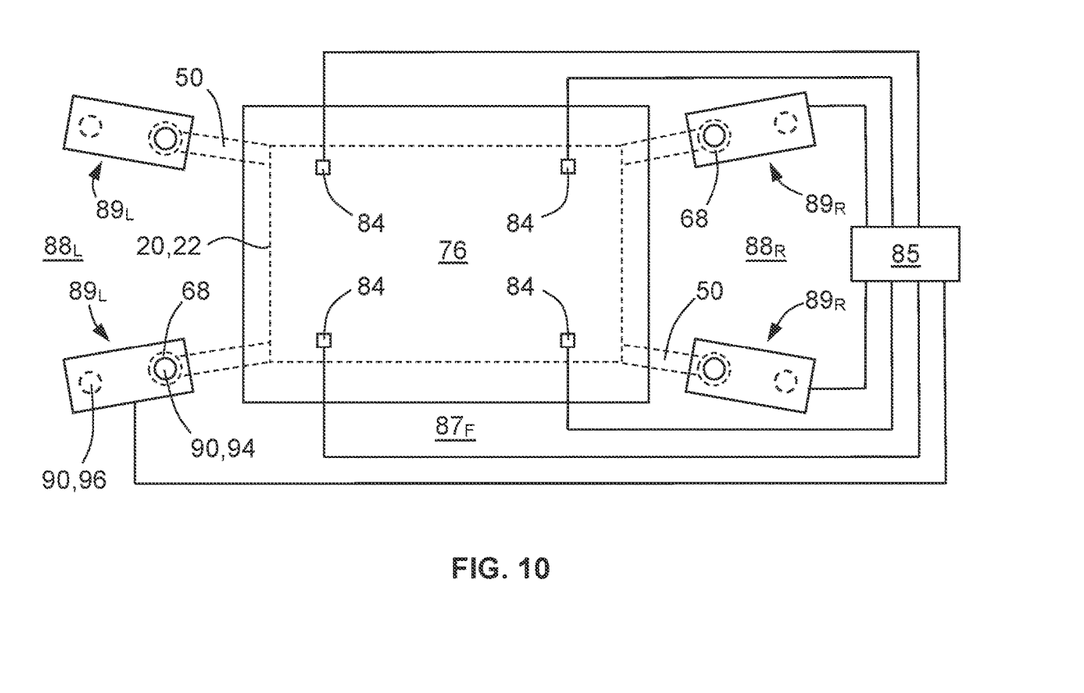
FIG. 10 is a schematic top view of another embodiment of a mold and reinforced preform.
Figure 13:
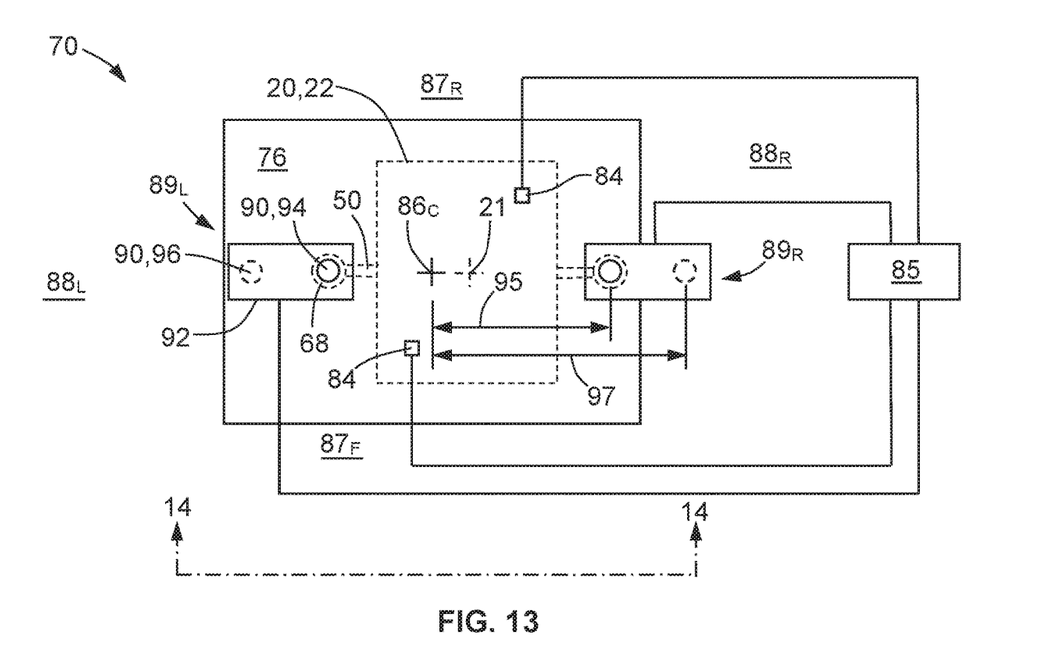
FIG. 13 is a schematic top view of yet another embodiment of a mold and reinforced preform.

The mold 70 further includes first and second moving members $89_L$, $89_R$, each having a respective coupling 90 configured for connection with a respective portion 68 of the reinforced preform 20, and a respective actuator 92 configured for moving the respective coupling 90 between a respective first position 94 in which the respective coupling 90 is disposed at a respective first distance 95 from a center $86c$ of the mold body 86 and a respective second position 96 in which the respective coupling 90 is disposed at a respective second distance 97 from the center $86c$ of the mold body 86 that is greater than the first distance 95. As illustrated in FIGS. 8, 9 and 13, the first and second distances 94, 96 may be measured directly from the center $86c$ of the mold body 86 (as in FIG. 13), or they may be measured to an edge 91 of the mold body 86 which lies a given distance 93 from the center $86c$ (as in FIGS. 8-9). Note that each of the first and second moving members $89_L$, $89_R$ may be configured to move in any combination of x-, y- and z-directions between its respective first and second positions 94, 96, as well as to other positions (including an adjusted position 98 discussed below).

The desired x-, y- and z-coordinates of each first and second position 94, 96 may be determined when the preform 20 is being designed. During this design stage, the layout of a reinforced part is determined, including the number of preforms 20 or layers needed to make the part, as well as the size, shape, dimensions and layout of various features (such as tethers 50 and alignment apertures 40) for each preform 20. A final reinforced part may utilize multiple layers of preforms 20, and these preforms 20 may all be the same or they may differ in some respect. The design stage may include simulations and finite element analysis work to model the characteristics and details of both (i) the reinforced part and its preforms 20, and (ii) the mold 70, including the layout of the molding surfaces 74, 78 and the respective first and second positions 94, 96 for each moving member $89_L$, $89_R$. (The design stage may also include determining the location of emitter/receiver pairs 82, 84, as discussed below.) As part of the design stage, it is also determined how much the preform 20 or sheet 22 of reinforced material should be stretched and in what directions, when it is placed into the mold 70, in order to avoid or minimize wrinkles and other potential defects, or to otherwise optimize the layout, strength or other characteristics of the finished part. Note that one or more of the alignment apertures 40 may be a bolt hole or other through-hole formed in the preforms 40 and in the final reinforced part, which may serve a purpose after the molding process. Optionally, one or more areas or portions of the finished part may be cut off or cut out after the molding process, which may include the tethers 50 and/or one or more of the alignment apertures 40.

In the foregoing arrangement, the first position 94 of each respective coupling 90 may be located in the first mold half 72, in the second mold half 76 or outside the mold body 86. Depending on the distance between the first and second positions 94, 96 for each moving member $89_L$, $89_R$, the second position 96 of each respective coupling 90 may itself be located in the first mold half 72, in the second mold half 76 or outside the mold body 86. For example, in FIGS. 7-10 each moving member $89_L$, $89_R$ is located entirely outside the mold body 86; the first moving members $89_L$ are located on the first/left lateral side $88_L$ of the mold body 86, and the second moving members $89_R$ are located on the second/right lateral side $88_R$ of the mold body 86. However, in FIGS. 13-14, the first moving member $89_L$ is located within the first mold half 72, and the second moving member $89_R$ is located partially within the first mold half 72 and partially outside the mold body 86 with its first position 94 in the first mold half 72 and its second position 96 outside the mold body 86.

The portions 68 (sometimes referred to herein as side portions 68) of the reinforced preform 20 with which the couplings 90 are configured for connection may include tethers 50 (and the elements attached or terminating at the second ends 54 thereof) and/or may include opposed first and second edges 24, 26 of the preform 20 or sheet 22. Each coupling 90 may be configured to engage its respective portion/side portion 68. For example, a coupling 90 may be configured as a gage pin, circular pin, tension rod or the like if it is to engage with a ring-shaped graspable member $60_R$ at the second end 54 of a tether 50. Or, the coupling 90 may be configured as a hook, claw, catch, clasp or other suitable mechanical element if it is to engage or connect with a loop 56, knot 58, graspable bar $60_B$, graspable T-shaped member $60_T$, or other similar element at the second end 54 of a tether 50. Alternatively, if the portion 68 to be grasped is simply an edge 24, 26 of the preform 20 or sheet 22, then the coupling 90 may be configured as a clamp, gripper, claw or other element capable of grasping that portion 68. As used herein, unless the context clearly indicates otherwise, the words "grasp", "connect", "attach" and "engage" (and their various noun, verb and adjective forms) may be used interchangeably.

The first molding surface 74 may generally protrude outward from the first mold half 72, and the second molding surface 78 may generally recede into the second mold half 76. For example, as illustrated in FIGS. 7-8, the first (lower) mold half 72 may be a "male" mold half whose first molding surface 74 generally protrudes outward (upward) from the first/lower/male mold half 72, and the second (upper) mold half 76 may be a "female" mold half whose second molding surface 78 generally recedes into the second/upper/female mold half 76. However, other configurations and arrangements of the mold halves 72, 76 are also possible. The reinforced preform 20 may be configured for placement over the first (e.g., male/lower) molding surface 74, and the couplings 90 may be configured for connection with the respective portions 68 of the reinforced preform 20. Note that used here, "over" may mean "on", "on top of", "above", "over the surface of" and the like, and may include the preform 20 making contact with at least some portion of the mold surface 74 or simply hovering some distance over/above the mold surface 74.

Figure 11:
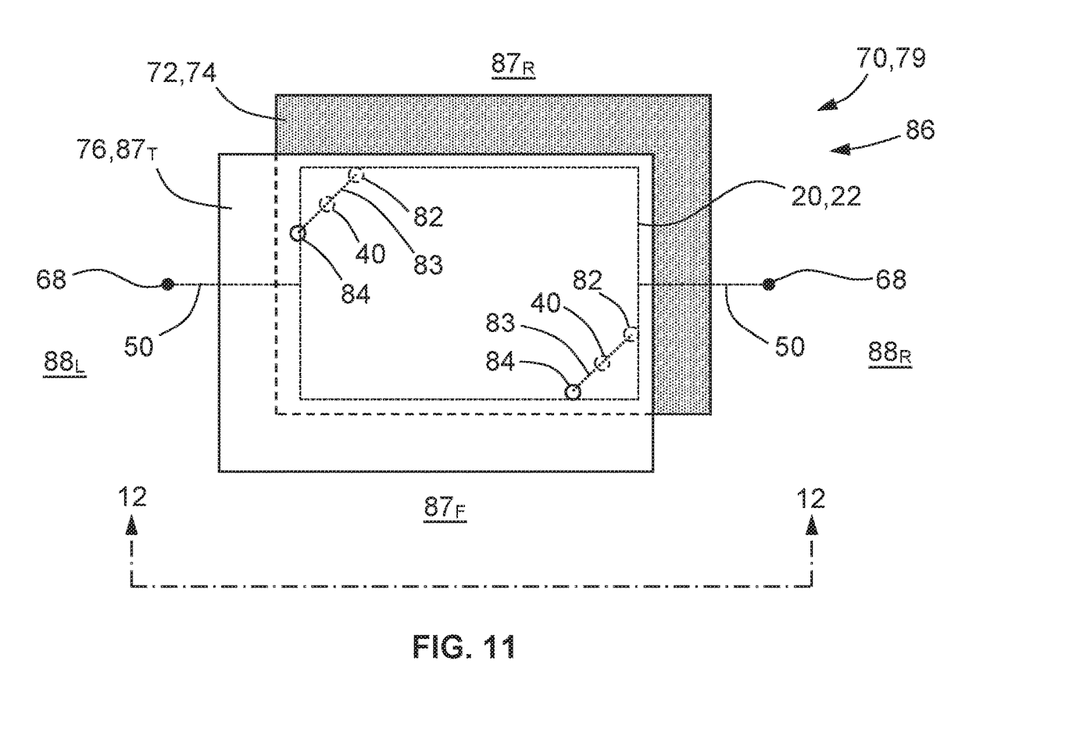
FIG. 11 is a schematic perspective top view of a reinforced preform sandwiched between top and bottom mold halves.
Figure 12:
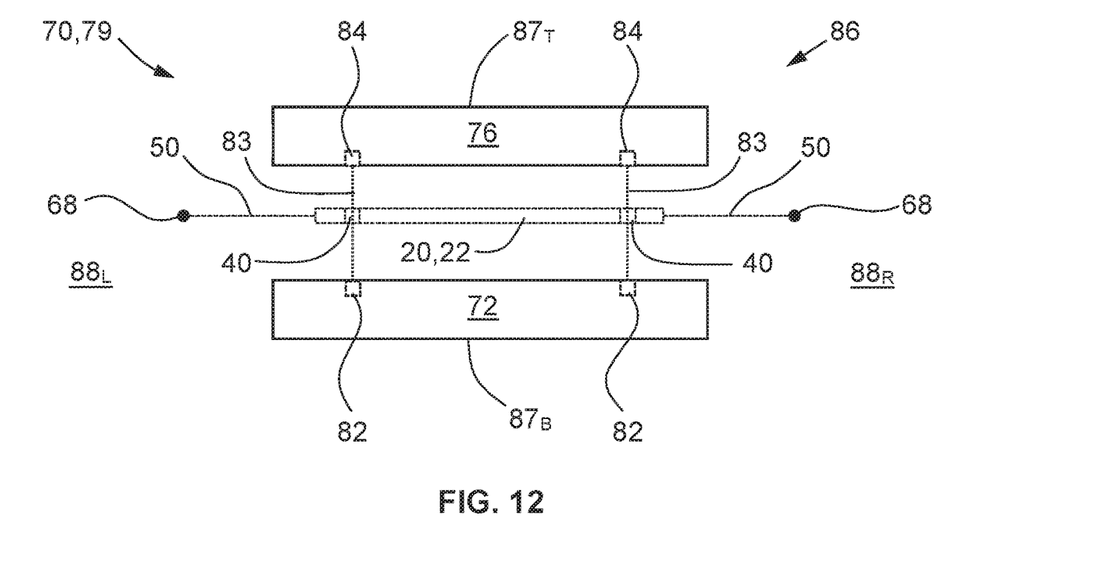
FIG. 12 is a schematic front view of the preform and mold halves of FIG. 11, as viewed along lines 12-12 of FIG. 11.
Figure 14:
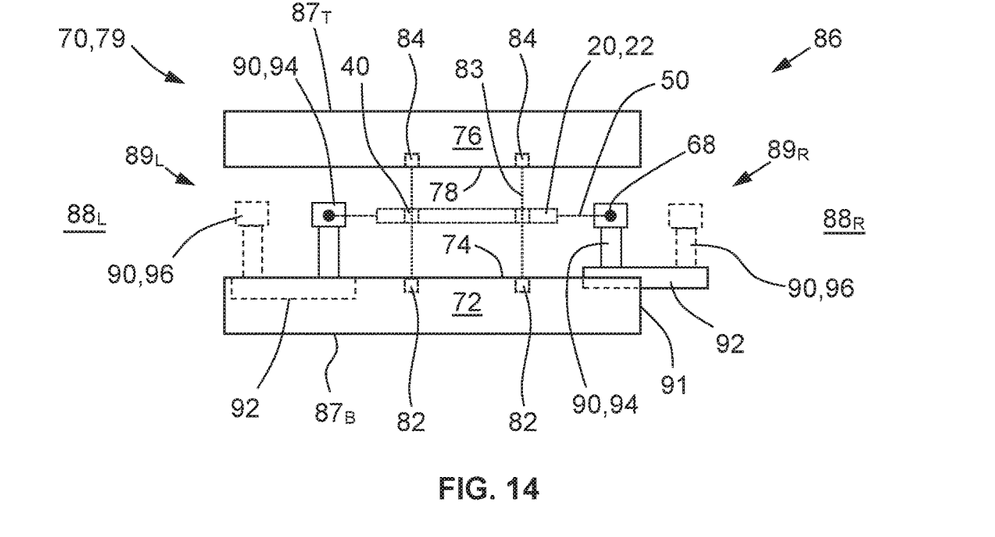
FIG. 14 is a schematic front view of the preform and mold of FIG. 13, as viewed along lines 14-14 of FIG. 13.

The mold 70 may further include: a first emitter 82 disposed in the first mold half 72 and configured to emit light 83 therefrom into the cavity 81; a first sensor/receiver 84 disposed in the second mold half 76 and configured to receive light 83 from the first emitter 82 and produce a first signal indicative of the light 83 received from the first emitter 82; a second emitter 82 disposed in one of the first and second mold halves 72, 76 and configured to emit light 83 therefrom into the cavity 81; and a second receiver 84 disposed in the other of the first and second mold halves 72, 76 and configured to receive light 83 from the second emitter 82 and produce a second signal indicative of the light 83 received from the second emitter 82. Note that although the drawings show two emitters 82 in the first mold half 72 and two receivers 84 in the second mold half 76, other arrangements are also possible. For example, the two emitters 82 may be in the second mold half 76 and the two receivers 84 may be in the first mold half 72, or one emitter 82 and one receiver 84 may be in each of the two mold halves 72, 76. In each configuration, each emitter 82 is paired with a respective receiver 84, such that each receiver 84 is configured to receive light 83 from its respective emitter 82. Each emitter/receiver pair 82, 84 may be arranged within the mold 70 such that the paired devices 82, 84 are located across the cavity 81 from each other, with the aim that when a reinforced preform 20 or sheet 20 of reinforced material is properly positioned within the mold 70, the light 83 will be directed by each emitter 82 through a respective alignment aperture 40 in the sheet/preform 22, 20 and will be received by the respective sensor/receiver 84, as illustrated in FIGS. 11, 12 and 14. Each receiver 84 may comprise one or more photosensors, optical sensors or other photodetecting devices, and each receiver 84 is configured to produce a signal that indicates the amount (and/or other characteristic or quality) of light 83 being received by the receiver 84. For example, each signal may provide a single voltage which correlates to the amount of light received by a receiver 84, or it may comprise two or more signals (or a single multiplexed or multipart signal) indicative of the amount of light received by multiple areas or regions of the receiver surface. (That is, the surface of the receiver 84 may have multiple individual cells, each capable of receiving light and generating its own signal or its own contribution to the overall signal.) If the preform 20 or sheet 22 is properly positioned with the two alignment apertures 40 in alignment with their corresponding emitter/receiver pairs 82, 84 (e.g., in linear alignment), then the signals generated will indicate such alignment. Likewise, when one or both of the apertures 40 is/are out of alignment, the signals may indicate this as well, including which of the apertures 40 is out of alignment and in which direction(s). (The specific details of any misalignments may be included as part of the signal, or such specifics may be deduced from the signals, such as by a controller 85 as described below.) Note that while two emitter/receiver pairs 82, 84 are illustrated in the drawings, additional pairs 82, 84 may also be used.

Figure 15:
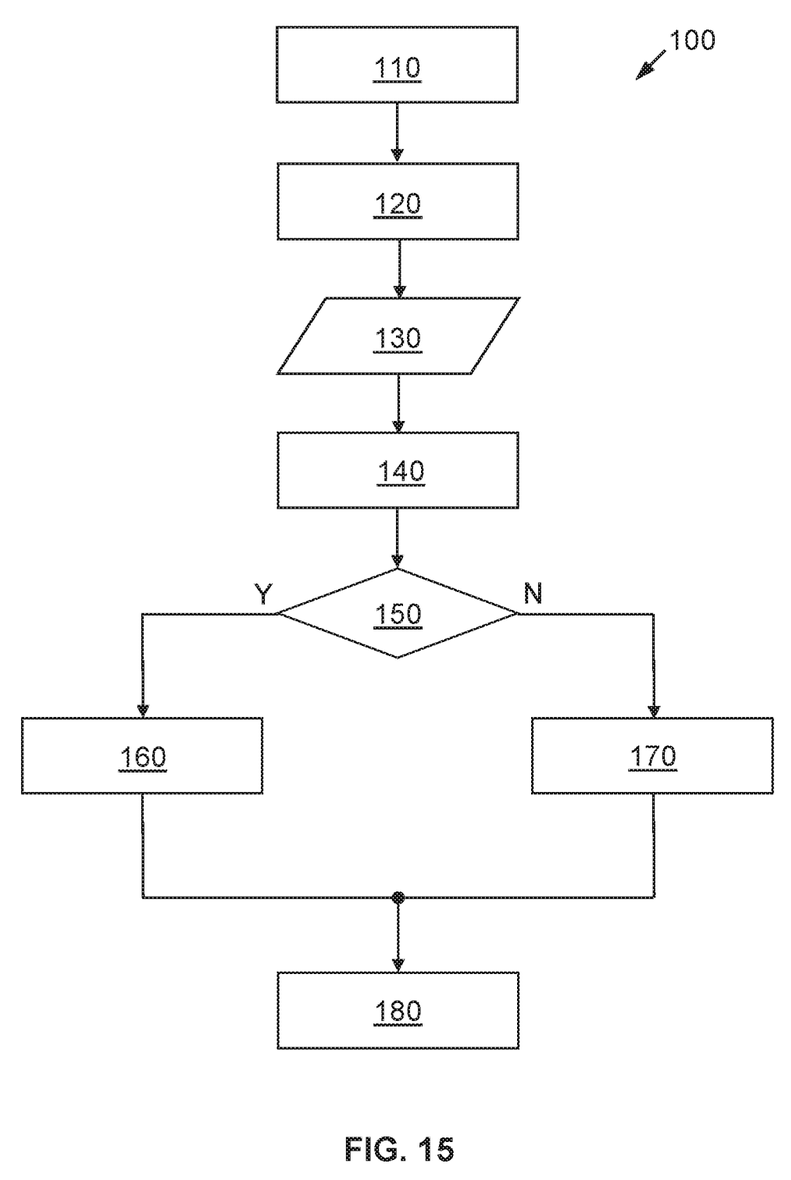
FIG. 15 is a sequence of controller steps for molding a reinforced preform.

The mold 70 may further include a controller 85 operatively connected to the first and second emitters 82, the first and second receivers 84, and the first and second moving members $89_L$, $89_R$. As illustrated in FIG. 15, the controller 85 may be configured to follow a process or sequence of steps 100 as follows. At block 110, each respective actuator 92 is caused to move its respective coupling 90 from its respective first position 94 to its respective second position 96, thereby stretching the sheet/preform 22, 20. At block 120, the first and second emitters 82 are caused to emit light 83, such as by supplying a required voltage or signal to the emitters 82. Note that the step 120 of causing the emitters 82 to emit light 83 may also occur before block 110. At block 130, the first and second signals are received from the first and second receivers 84. At block 140, an alignment condition is determined based on the first and second signals. The alignment condition indicates how well the preform's alignment apertures 40 are aligned within the mold 70 with respect to the respective emitters 82 and receivers 84. The controller 85 may utilize algorithms, routines or other processes to calculate, infer or deduce the degree and quality of alignment or misalignment of the apertures 40 based on the first and second signals. Note that the first and second signals may be combined or multiplexed prior to receipt by the controller 85 such that only a single signal is received by the controller 85. At block 150, the controller 85 determines whether the alignment condition meets predetermined criteria. These predetermined criteria indicate the quantitative and/or qualitative conditions desired (and the variances and tolerances permitted) for the location and/or orientation of the apertures 40 with respect to their corresponding emitter/receiver pairs 82, 84. The determination made at block 140 can be a go/no-go type of determination (i.e., either the apertures 40 are properly aligned or not properly aligned), or it may be more of a qualitative determination (e.g., each aperture 40 is offset from its ideal/desired location or orientation by certain amounts in the x- and y-directions and/or by certain amounts of angular rotation clockwise or counterclockwise about the z-direction). If the alignment condition meets the predetermined criteria, then at block 160, the mold 70 is "closed" by moving the mold halves 72, 76 from the open position 79 to the generally closed position 80. Otherwise, if the alignment condition does not meet the predetermined criteria, then at block 170, an error condition alert is sent, and/or at least one of the actuators 92 is caused to move its respective coupling 90 from its respective first position 94 to a respective adjusted position 98 based on the alignment condition. At block 180, one of several options may occur, such as determining a new alignment condition and comparing it against the predetermined criteria, moving the preform 20 and/or moving members $89_L$, $89_R$ again, redirecting back to a previous block, causing the emitters 82 to cease emitting light 83, or stopping to await intervention by a human mold operator.

Figure 16:
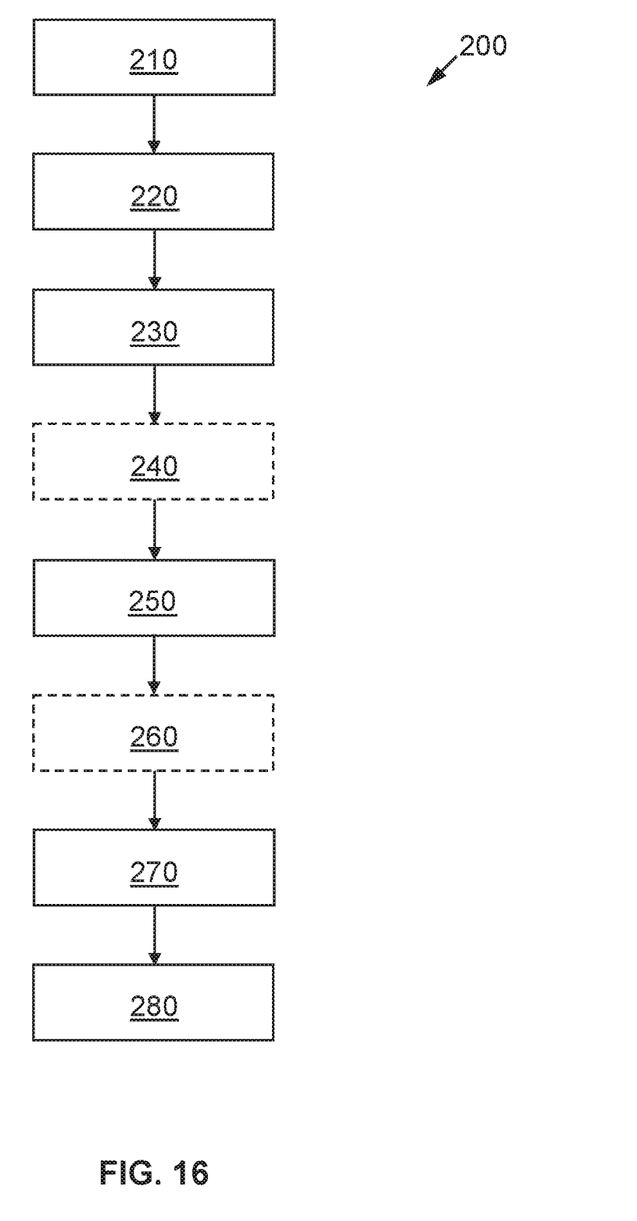
FIG. 16 is a flowchart for one embodiment of a method for molding a reinforced preform.

FIG. 16 shows a method 200 for molding a reinforced preform 20 in a mold 70. Here, the preform 20 includes a sheet 22 of reinforced material and has opposed first and second side portions 68, and the mold 70 has first and second mold halves 72, 76 presenting respective first and second molding surfaces 74, 78. The first and second mold halves 72, 76 define a mold body 86 and are disposed or oriented with the first and second molding surfaces 74, 78 facing each other. At block 210 the preform 20 is positioned between the first and second mold halves 72, 76. At block 220 the first and second side portions 68 are grasped (e.g., by engagement or connection with first and second moving members $89_L$, $89_R$), and at block 230 at least one of the first and second side portions 68 is moved away from a center 86c of the mold body 86 (e.g., by moving one or more couplings 90 outward from the center 86c of the mold body 86) so as to stretch the sheet 22 of reinforced material. The method 200 may further include: at block 250, transitioning the first and second mold halves 72, 76 from an open position 79 in which the mold halves 72, 76 are spaced apart from each other to a generally closed position 80 in which the mold halves 72, 76 are proximate each other, thereby forming a molded preform; at block 270, transitioning the first and second mold halves 72, 76 from the generally closed position 80 to the open position 79; and, at block 280, placing another reinforced preform 20 between the first and second mold halves 72, 76 in registration with the molded preform. Here, "registration" may include aligning the alignment apertures 40 of the added preform 40 with the corresponding alignment apertures 40 of the already-molded preform 40, such that the light 83 emitted from the respective emitters 82 can pass through the aligned apertures 40 and be received by the respective receivers 84. Additional optional steps, as indicated by the blocks in dashed lines, may also be executed; these include, at block 240, adjusting a placement, location and/or orientation of the preform 20 by moving the first and second side portions 68 in a first direction (e.g., in a direction that would improve the alignment of the apertures 40 with their respective emitter/receiver pairs 82, 84, such as by determining an alignment condition based on the received first and second signals, comparing the alignment condition with predetermined criteria and determining a first direction in which the preform 20 may be moved, rotated or otherwise adjusted); and, at block 260, adding a resin to the sheet 20 of reinforced material.

Also illustrated is a mold 70 for molding a reinforced preform 20, wherein the preform 20 has at least two alignment apertures 40 therein. The mold 70 includes a first mold half 72 having a first molding surface 74 and a second mold half 76 having a second molding surface 78, the first and second mold halves being disposed or oriented with the first and second molding surfaces 74, 78 facing each other. The mold halves 72, 76 are configured so as to transition between an open position 79 in which the mold halves 72, 76 are spaced apart from each other, and a generally closed position 80 in which the mold halves 72, 76 are proximate each other and define a cavity 81 between the first and second molding surfaces 74, 78. A first emitter 82 is disposed in the first mold half 72 and is configured to emit light 83 therefrom into the cavity 81. A first receiver 84 is disposed in the second mold half 76 and is configured to receive light 83 from the first emitter 82 and produce a first signal indicative of the light 83 received from the first emitter 82. A second emitter 82 is disposed in one of the first and second mold halves 72, 76 and is configured to emit light 83 therefrom into the cavity 81. A second receiver 84 is disposed in the other of the first and second mold halves 72, 76 and is configured to receive light 83 from the second emitter 82 and produce a second signal indicative of the light 83 received from the second emitter 83. The mold 70 may further include a controller 85 operatively connected to the first and second emitters 82 and the first and second receivers 84, with the controller 85 being configured to cause the first and second emitters 82 to emit light 83, and receive the first and second signals from the first and second receivers 84.

The two mold halves 72, 76 may define a mold body 86, with the mold 70 further including first and second moving members $89_L$, $89_R$, each having a respective coupling 90 configured for connection with a respective side portion 68 of the reinforced preform 20 and a respective actuator 92 configured for moving the respective coupling 90 between a respective first position 94 in which the respective coupling 90 is disposed at a respective first distance 95 from a center 86c of the mold body 86 and a respective second position 96 in which the respective coupling 90 is disposed at a respective second distance 97 from the center 86c of the mold body 89 that is greater than the first distance 95. In this arrangement, the first position 94 of each respective coupling 90 may be located in the first mold half 72, in the second mold half 76, or outside the mold body 86. The first and second moving members $89_L$, $89_R$ may be configured such that when the reinforced preform 20 is placed between the first and second mold halves 72, 76, and each coupling 90 is connected with its respective side portion 68, and the actuators 92 move their respective couplings 90 from their respective first positions 94 to their respective second positions 96, the first and second moving members $89_L$, $89_R$ are effective to stretch the reinforced preform 20. The mold 70 may further include a controller 85 operatively connected to the first and second emitters 82, the first and second receivers 84, and the first and second moving members $89_L$, $89_R$, with the controller 85 being configured to execute the sequence of process steps 100 described above.

Figure 17:
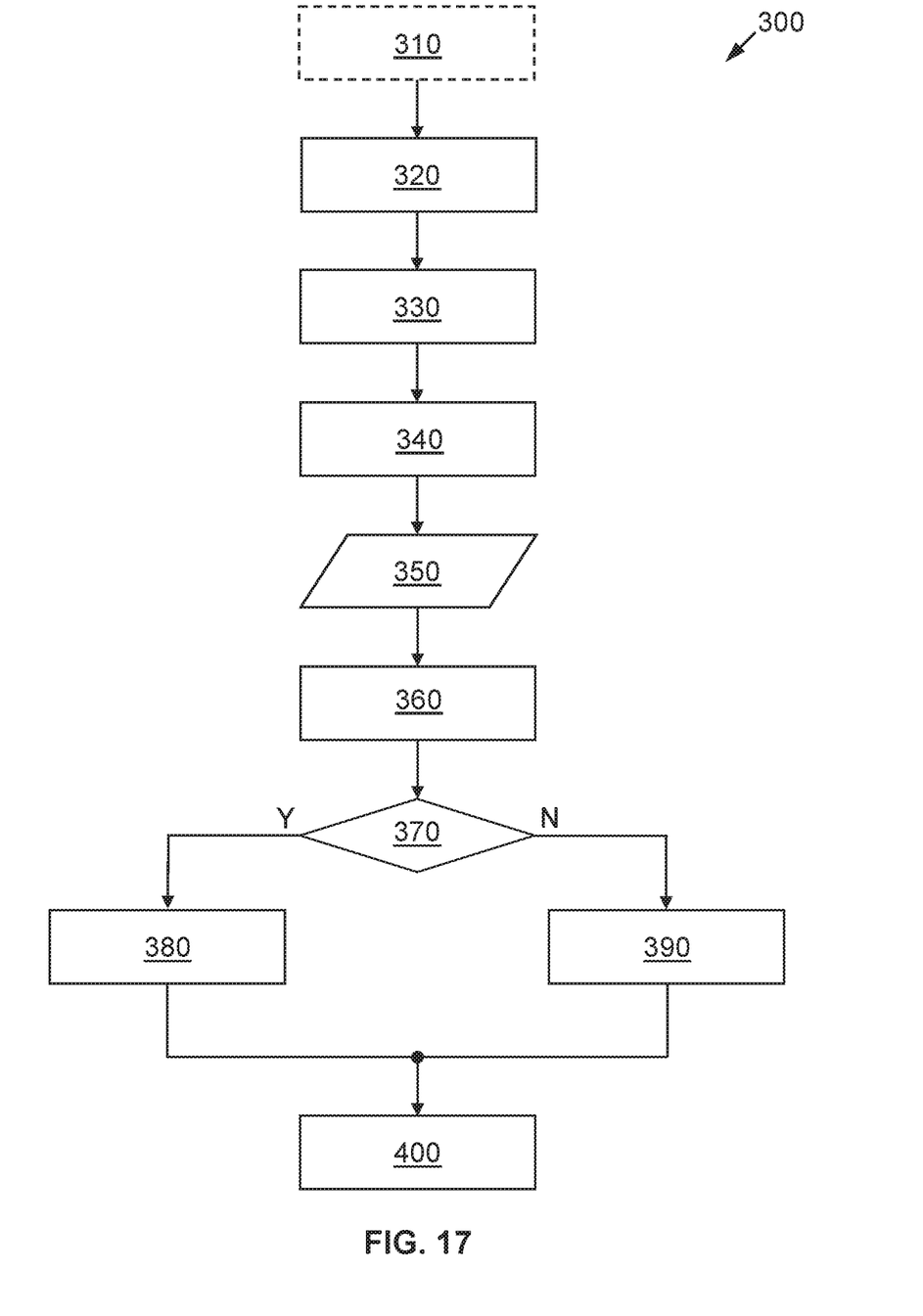
FIG. 17 is a flowchart for another embodiment of a method for molding a reinforced preform.

FIG. 17 illustrates another method 300 for molding a reinforced preform 20 in a mold 70. The preform 20 has first and second alignment apertures 40 therein, and the mold 70 has first and second mold halves 72, 76 presenting respective first and second molding surfaces 74, 78. The first and second mold halves 72, 76 are disposed with the first and second molding surfaces 74, 78 facing each other. The mold 70 further includes: (i) a first emitter 82 disposed in the first mold half 72 and configured to emit light 83 therefrom; (ii) a first receiver 84 disposed in the second mold half 76 and configured to receive light 83 from the first emitter 82 and produce a first signal indicative of the light 83 received from the first emitter 82; (iii) a second emitter 82 disposed in one of the first and second mold halves 72, 76 and configured to emit light 83 therefrom; and (iv) a second receiver 84 disposed in the other of the first and second mold halves 72, 76 and configured to receive light 83 from the second emitter 84 and produce a second signal indicative of the light 83 received from the second emitter 84.

As an optional step, at block 310, opposed first and second side portions 68 of the preform 20 may be grasped (such as by the moving members $89_L$, $89_R$ or other approaches described above). At block 320, the preform 20 is positioned between the first and second mold halves 72, 76 with the first alignment aperture 40 disposed between the first emitter 82 and first receiver 84 and the second alignment aperture 40 disposed between the second emitter 82 and second receiver 84. (This type of alignment is illustrated in FIGS. 11-12, where the light 83 emitted from each emitter 82 proceeds through a respective alignment aperture 40 and onto a respective receiver 84.) At block 330, one or both of the first and second side portions 68 are moved outward from a center 21 of the preform 20 so as to stretch the preform 20. For example, this may be accomplished by grasping the opposed side portions 68 (as in optional block 310), such as by use of moving members $89_L$, $89_R$ whose couplings 90 are attached to the side portions 68 of the preform 20, and then using the actuators 92 to move their respective couplings 90 from their first positions 94 to their second positions 96. At block 340, the first and second emitters 82 are caused to emit light 83, and at block 350, the first and second signals are received from the first and second receivers 84. At block 360, an alignment condition is determined based on the first and second signals. At block 370, it is determined whether the alignment condition meets certain predetermined criteria. If the alignment condition meets the predetermined criteria, then, at block 380, the mold 70 may be "closed" as described above. However, if the alignment condition does not meet the predetermined criteria, then, at block 390, an error condition alert is sent, and/or the position of the first and second side portions 68 are adjusted in a first direction so as to adjust a placement, location and/or orientation of the preform 20. At block 400, one of several options may occur, such as determining a new alignment condition and comparing it against the predetermined criteria, moving the preform 20 and/or moving members $89_L$, $89_R$ again, redirecting back to a previous block, causing the emitters 82 to cease emitting light 83, stopping to await intervention or action by a human mold operator, etc.

The reinforced preform 20, the mold 70 and the methods 200, 300 provide various advantages over previous approaches. For example, the use of tethers 50 allows the preforms 20 to be easily manipulated by both human operators and robotic handling equipment. The tethers 50 and the loops 56, knots 58 and graspable members 60 at the second ends 54 of the tethers 50, as well as the tethers 50 being attached to the perimeter of the sheet 22 at both the first connection points 32, 34, 36, 38 and second connection points 35, 39, permits the performs 20 to be grasped on opposing sides 24, 26 by moving members $89_L$, $89_R$ so that the sheets 22 may be appropriately stretched, thereby helping to eliminate wrinkles, kinks and other inconsistencies.

The use of alignment apertures 40 in the preforms 20 and emitter/receiver pairs 82, 84 in the mold halves 72, 76 that are laid out in corresponding locations helps determine whether the preforms 20 are properly aligned when they are positioned between the mold halves 72, 76, and enables any misalignments to be detected and corrected.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. While the dimensions and types of materials described herein are intended to be illustrative, they are by no means limiting and are exemplary embodiments. Moreover, in the following claims, use of the terms "first", "second", "top", "bottom", etc. are used merely as labels, and are not intended to impose numerical or positional requirements on their objects. Additionally, the phrase "at least one of A and B" should be understood to mean "only A, only B, or both A and B." And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. While the methods described herein are illustrated using particular sequences of steps, the order of these steps may be changed. In this regard, each block in the flowchart or block diagrams may represent a module, segment or portion of code, which includes one or more executable instructions for implementing the specified logical function(s). These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A reinforced preform, comprising:
   a sheet of reinforced material having opposed first and second edges, each having a respective first connection point located therealong; and
   first and second tethers, each attached at a respective first end thereof to a respective one of the first connection points and having a respective second end thereof terminating in at least one of:
   a respective loop tied at the respective second end,
   a respective knot tied at the respective second end, a respective graspable member to which the respective second end is connected, and an attachment to a respective second connection point located along a perimeter of the sheet.

2. A reinforced preform according to claim 1, further comprising:

at least two alignment apertures formed in the sheet of reinforced material and spaced apart from each other.

3. A reinforced preform according to claim 1, wherein the graspable member is one of a ring, a bar and a T-shaped member.

4. A reinforced preform according to claim 1, wherein each first connection point is located at a respective corner of a respective one of the first and second edges.

5. A reinforced preform according to claim 1, wherein the tethers are made of reinforced material.

6. A reinforced preform according to claim 5, wherein the tethers and the sheet of reinforced material are formed together during a singular fabrication process.

7. A reinforced preform according to claim 6, wherein the tethers and the sheet of reinforced material are cut from a single blank of reinforced material.

8. A reinforced preform according to claim 6, wherein the tethers and the sheet of reinforced material are created as a unitary structure by additive manufacturing.

9. A reinforced preform according to claim 5, wherein the tethers are formed separately from the sheet of reinforced material and are attached to the sheet of reinforced material after fabrication of the sheet of reinforced material.

10. A reinforced preform according to claim 1, wherein the respective first and second connection points for each of the first and second tethers are on a respective one of the first and second edges.

11. A mold for molding a reinforced perform, wherein the perform includes a sheet of reinforced material having opposed first and second edges each having a respective first connection point located therealong, the perform further including first and second tethers each attached at a respective first end thereof to a respective one of the first connection points and having a respective second end thereof terminating in at least one of a respective loop tied at the respective second end, a respective knot tied at the respective second end, a respective graspable member to which the respective second end is connected, and an attachment to a respective second connection point located along a perimeter of the sheet, comprising:

a first mold half having a first molding surface;

a second mold half having a second molding surface;

the first and second mold halves being disposed with the first and second molding surfaces facing each other, the mold halves being configured to transition between an open position in which the mold halves are spaced apart from each other and a generally closed position in which the mold halves are proximate each other and define a mold body having a cavity between the first and second molding surfaces; and first and second moving members, each having a respective coupling configured for connection with a respective portion of the reinforced preform and a respective actuator configured for moving the respective coupling between a respective first position in which the respective coupling is disposed at a respective first distance from a center of the mold body and a respective second position in which the respective coupling is disposed at a respective second distance from the center of the mold body that is greater than the first distance, wherein the first position of each respective coupling is located in the first mold half, in the second mold half or outside the mold body.

12. A mold according to claim 11, wherein the first molding surface generally protrudes outward from the first mold half, and the second molding surface generally recedes into the second mold half.

13. A mold according to claim 12, wherein the reinforced preform is configured for placement over the first molding surface and the couplings are configured for connection with the respective portions of the reinforced preform.

14. A mold according to claim 11, further comprising:

a first emitter disposed in the first mold half and configured to emit light therefrom into the cavity;

a first receiver disposed in the second mold half and configured to receive light from the first emitter and produce a first signal indicative of the light received from the first emitter; a second emitter disposed in one of the first and second mold halves and configured to emit light therefrom into the cavity; and a second receiver disposed in the other of the first and second mold halves and configured to receive light from the second emitter and produce a second signal indicative of the light received from the second emitter.

15. A mold according to claim 14, further comprising:

a controller operatively connected to the first and second emitters, the first and second receivers, and the first and second moving members, the controller being configured to cause each respective actuator to move its respective coupling from its respective first position to its respective second position, cause the first and second emitters to emit light, receive the first and second signals from the first and second receivers, determine an alignment condition based on the first and second signals, determine if the alignment condition meets predetermined criteria, if the alignment condition meets the predetermined criteria, then transition the mold halves from the open position to the generally closed position, and if the alignment condition fails to meet the predetermined criteria, then send an error condition alert and/or cause at least one of the actuators to move its respective coupling from its respective first position to a respective adjusted position different from the second position based on the alignment condition.

16. A method for molding a reinforced preform in a mold, wherein the preform includes a sheet of reinforced material and has opposed first and second side portions and wherein the mold has first and second mold halves presenting respective first and second molding surfaces, the first and second mold halves defining a mold body and being disposed with the first and second molding surfaces facing each other, the sheet of reinforce material having opposed first and second edges each having a respective first connection point located therealong, the perform including first and second tethers each attached at a respective first end thereof to a respective one of the first connection points and having a respective second end thereof terminating in at least one of a end, a respective graspable member to which the respective second end is connected, and an attachment to a respective second connection point along a perimeter of the sheet, comprising:

positioning the preform between the first and second mold halves; and moving at least one of the first and second side portions away from a center of the mold body so as to stretch the sheet of reinforced material.

17. A method for molding according to claim 16 further comprising:
    adjusting a placement of the preform by moving the first and second side portions in a first direction.

18. A method for molding according to claim 16 further comprising:
    adding a resin to the sheet of reinforced material.

19. A method for molding according to claim 16 further comprising:
    transitioning the first and second mold halves from an open position in which the mold halves are spaced apart from each other to a generally closed position in which the mold halves are proximate each other, thereby forming a molded preform.

20. A method for molding according to claim 19 further comprising:
    transitioning the first and second mold halves from the generally closed position to the open position; and
    placing another reinforced preform between the first and second mold halves in registration with the molded preform.

* * * * *